United States Patent
Kirbach et al.

(10) Patent No.: US 9,004,267 B2
(45) Date of Patent: Apr. 14, 2015

(54) CONVEYING SYSTEM SEALED OFF FROM THE SURROUNDING ATMOSPHERE

(71) Applicant: Aumund Fordertechnik GmbH, Kamp-Lintfort (DE)

(72) Inventors: Guido Kirbach, Rheinberg (DE); Matthias Moritz, Kamp-Lintfort (DE); Christian Niedzwiedz, Rheinberg (DE); Frank Reddemann, Duisburg (DE)

(73) Assignee: Aumund Fordertechnik, Rheinberg (DE)

( * ) Notice: Subject to any disclaimer, the term of this patent is extended or adjusted under 35 U.S.C. 154(b) by 0 days.

(21) Appl. No.: 14/348,535

(22) PCT Filed: Sep. 27, 2012

(86) PCT No.: PCT/EP2012/069039
§ 371 (c)(1),
(2) Date: Mar. 28, 2014

(87) PCT Pub. No.: WO2013/045529
PCT Pub. Date: Apr. 4, 2013

(65) Prior Publication Data
US 2014/0311870 A1    Oct. 23, 2014

(30) Foreign Application Priority Data
Sep. 28, 2011    (DE) .................... 20 2011 051 470 U

(51) Int. Cl.
| B65G 17/36 | (2006.01) |
| F27D 3/12 | (2006.01) |
| B65G 17/12 | (2006.01) |
| F27B 9/04 | (2006.01) |
| B65G 21/08 | (2006.01) |

(52) U.S. Cl.
CPC .............. *B65G 17/123* (2013.01); *B65G 21/08* (2013.01); *F27B 9/047* (2013.01); *F27D 3/12* (2013.01); *B65G 17/36* (2013.01)

(58) Field of Classification Search
USPC ......... 198/701, 702, 707, 708, 710, 711, 712, 198/713, 860.3; 266/178–180
See application file for complete search history.

(56) References Cited

U.S. PATENT DOCUMENTS 3,367,644 A * 2/1968 Ban .................................. 34/181
3,381,949 A * 5/1968 Rowen .......................... 266/179
(Continued)

FOREIGN PATENT DOCUMENTS

WO    2007065582 A2    6/2007

OTHER PUBLICATIONS

International Search Report, Nov. 26, 2012, ISA/EPO.

*Primary Examiner* — Mark A Deuble
(74) *Attorney, Agent, or Firm* — Jennifer S. Stachniak; Robert W. Becker

(57) ABSTRACT

A conveying system includes conveying cells (14) for accommodating in particular hot bulk goods or lumpy conveying material. The conveying cells have a bottom (16), a front wall (30) and a rear wall (31) in the conveying direction of the conveying system and side walls (15) connecting the latter. The conveying cells (14) open at the top are shielded from the surrounding atmosphere by a stationary and gas-tight top cover (17) that spans the open surface of the conveying cells. Both sealing elements (22; 34, 35) shielding intermediate spaces (32) existing between the conveying cells (14) in the conveying direction from the surrounding atmosphere and also sealing elements (22; 28) projecting laterally on both sides beyond the side walls (15) of the conveying cells (14) are disposed in the bottom region of the conveying cells (14) lying opposite the top cover (17).

12 Claims, 3 Drawing Sheets

(56) References Cited

U.S. PATENT DOCUMENTS

| | | | |
|---|---|---|---|
| 3,393,904 A * | 7/1968 | Taylor | 266/179 |
| 3,744,777 A * | 7/1973 | Marsh | 266/179 |
| 3,795,305 A * | 3/1974 | Sandvik | 198/706 |
| 4,129,209 A * | 12/1978 | Mayfeld | 198/712 |
| 4,408,987 A * | 10/1983 | Oyler | 432/137 |
| 4,825,561 A * | 5/1989 | Cornell | 34/242 |

* cited by examiner

CONVEYING SYSTEM SEALED OFF FROM THE SURROUNDING ATMOSPHERE

The instant application should be granted the priority dates of Sep. 28, 2011, the filing date of the corresponding German patent application DE 20201105147.6, as well as Sep. 27, 2012, the filing date of the International patent application PCT/EP2012/069039.

BACKGROUND OF THE INVENTION

The invention relates to a conveying system, in particular bucket conveyors or cell conveyors, with conveying cells for accommodating in particular hot bulk goods or lumpy conveying material, said conveying cells comprising a bottom, a front wall and a rear wall in the conveying direction of the conveying system and side walls connecting the latter, wherein the conveying cells open at the top are shielded from the surrounding atmosphere by means of a stationary and gas-tight top cover that spans the open surface of the conveying cells and by means of stationary and gas-tight side covers disposed on both sides of the conveying cells and a protective gas is introducible into the interior enclosed by the top cover and the side covers.

A conveying system with the aforementioned features is known from WO 2007/065582 A1. The conveying elements of the conveying system, which are constituted in the form of conveying cells or conveying buckets which in each case comprise a bottom, a front wall and a rear wall in the conveying direction and side walls connecting the latter and which are connected by chains as traction members, slide on rails by means rollers fitted laterally to said conveying elements. A top cover and mutually opposite side covers are fitted above and at the sides of the conveying elements in each case in a stationary arrangement, said covers shielding the conveying elements running inside the covers from the surrounding atmosphere and thus creating on the one hand a thermal insulation of a hot or warm conveyed material and on the other hand enabling the generation of a protective gas atmosphere in the interior of the covers by the introduction of a suitable protective gas, in order to prevent undesired reactions, in particular oxidation, in the conveyed material. The stationary side covers are disposed in the plane of the lateral rollers and end at a distance above the latter.

The drawback is still associated with the known conveying system that sealing of the space enclosed by the top cover and the side covers is not provided at the bottom, so that in this region the admission of surrounding air or an escape of introduced protective gas is possible.

The problem underlying the invention, therefore, is to improve the shielding of the conveying elements from the surrounding atmosphere in a conveying system with the generic features.

SUMMARY OF THE INVENTION

In its basic idea, the invention makes provision such that both the sealing elements shielding intermediate spaces existing between the conveying cells in the conveying direction from the surrounding atmosphere and also sealing elements projecting laterally on both sides beyond the side walls of the conveying cells and in each case forming a sealing gap with the lower edge of the stationary side covers are disposed in the bottom region of the conveying cells lying opposite the top cover.

With the invention, therefore, a completely shielded space is created, which on the one hand is formed by the stationary cover parts such as the top cover and side covers and on the other hand by the sealing elements each moving along with the conveying cells. With regard to the movement of the conveying cells with sealing elements fixed thereon relative to the stationary side covers, the individual sealing elements each form a sealing gap with the stationary side covers that should be set as small as possible. Insofar as the conveying cells have to be conveyed over assigned deflection wheels at the respective ends of the conveying system, the sealing elements fitted on the individual conveying cells are opened with respect to one another and, to this extent, do not hinder the deflection of the conveying cells in the region of the deflection wheels.

In a first embodiment of the invention, provision is made such that, as sealing elements sealing off the conveying cells against one another in the conveying direction, there is disposed in each case at the front wall and at the rear wall of each conveying cell a sealing plate projecting therefrom into the intermediate space existing between two successive conveying cells, in such a way that the sealing plate disposed on the rear wall of the one conveying cell and the sealing plate disposed on the front wall of the following conveying cell overlap one another. Sealing of the conveying cells in the conveying direction is thus provided.

The sealing between the individual conveying cells is improved by the fact that provision can be made such that the rear wall of each conveying cell is disposed displaced forwards in the conveying direction with respect to the—in the conveying direction—rear end of the two side walls and the front wall of the following conveying cell engages between the side walls of the conveying cell in front, wherein the side walls of the conveying cell in front and of the following conveying cell overlap in a partial region.

In addition, provision can be made such that the front wall of each conveying cell comprises at its upper edge a bent-off portion projecting from the front wall in the direction of the conveying cell in front, engaging over the intermediate space to the conveying cell in front and extending over the upper edge of the rear wall of the conveying cell in front.

With regard to lateral sealing of the conveying cells against the stationary side covers, provision can be made according to an example of the embodiment of the invention such that an angled sealing plate is in each case fitted as a sealing element to the two side walls of each conveying cell, the leg of said sealing plate projecting from the side walls forming the sealing gap with the lower edge of the stationary side covers.

Provision can be made here such that each angled sealing plate fitted to a side wall is disposed at a distance from the—in the conveying direction—front edge of the side wall, said distance corresponding to the overlapping of the side walls of adjacent conveying cells, so that the projecting legs of the sealing plates on the side walls of successive conveying cells form a continuous run.

According to an alternative embodiment of the invention, provision is made such that sealing plates lying opposite the top cover and moving along with the conveying cells are disposed at the underside of the conveying cells, said sealing plates, in the form of a continuous belt mat, shielding the conveying cells and the intermediate spaces existing between the latter from the surrounding atmosphere and projecting on both sides beyond the side walls and thus forming the sealing gap with the lower edge of the stationary side covers.

According to an example of embodiment of the invention, provision is made such that the conveying cells are conveyed on both sides by means of rollers on rails disposed outside the conveying cells, wherein the side covers are disposed inside the distance between the mutually opposite rollers and form here the sealing gap with the sealing elements. The possibility of a connection to the sealing elements moving along with the conveying cells is provided by the shifting of the side covers inwards.

In a manner known per se, provision is made according to an example of embodiment of the invention such that the conveying cells are connected in their bottom region to at least one traction member.

In this regard, provision can be made according to an example of embodiment of the invention such that the traction member is constituted as a chain, the chain link plates whereof are each fastened to the conveying cells by means of angle brackets fixed to the bottom region of the conveying cells.

In the example of embodiment of the invention with sealing elements constituted as sealing plates, provision can be made such that the sealing plates are disposed between the bottom region of the conveying cells and the traction member.

In order to improve the insulating effect, especially of the side covers, provision is made according to an example of embodiment in a manner known per se from the generic WO 2007/065582 A1 such that the side covers are lined with an insulating layer on their inner side facing the conveying elements.

BRIEF DESCRIPTION OF THE DRAWINGS

Examples of embodiment of the invention which are described below are reproduced in the drawing. In the figures.

DETAILED DESCRIPTION OF THE PREFERRED EMBODIMENTS

Figure 1:
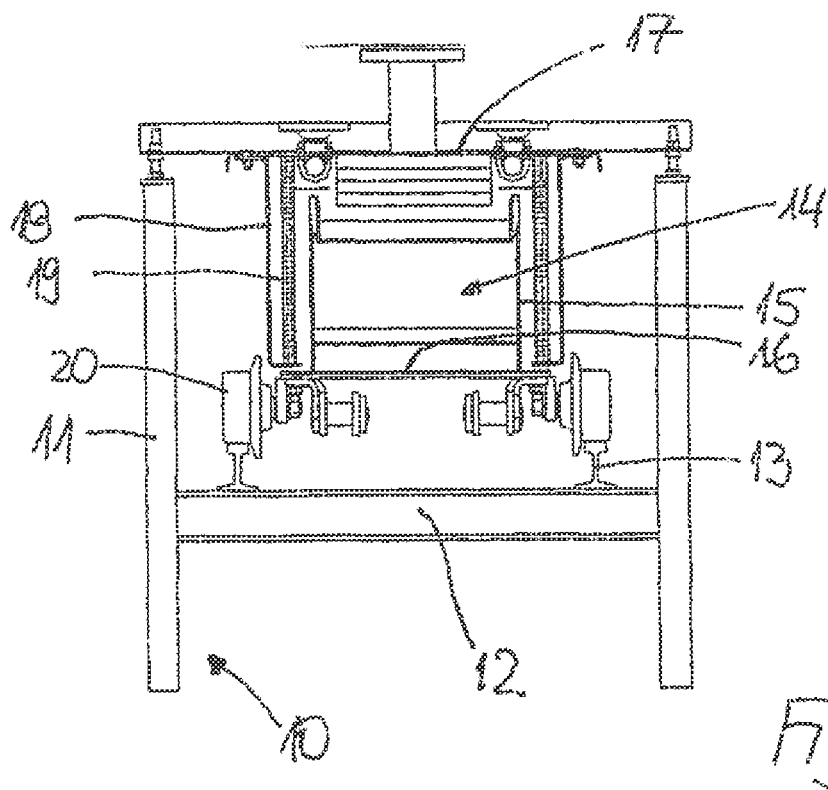
FIG. 1 shows, in a diagrammatic front view, a frame with a conveying system disposed therein and comprising conveying elements running on lateral rails.

In the first place, a frame 10 with outer upright legs 11, between which transverse supports 12 run, emerges from FIG. 1. Two rails 13 disposed at a distance from one another and extending in the longitudinal direction of the conveying system are mounted on transverse supports 12, on which rails conveying cells 14 constituted in a manner yet to be described run, said conveying cells serving to transport preferably hot bulk goods and hot lumpy conveying material. Conveying cells 14 are constituted trough-like with an open surface and comprise side walls 15 and a bottom 16.

In order to shield the conveying material to be conveyed in conveying cells 14 from the surrounding atmosphere, a top cover 17 is provided, which is supported by upright legs 11. Side covers 18 laterally enclosing conveying cells 14 are fitted to top cover 17, said side covers each being lined with an insulating layer 19 on their inner side facing conveying cells 14.

Figure 2:
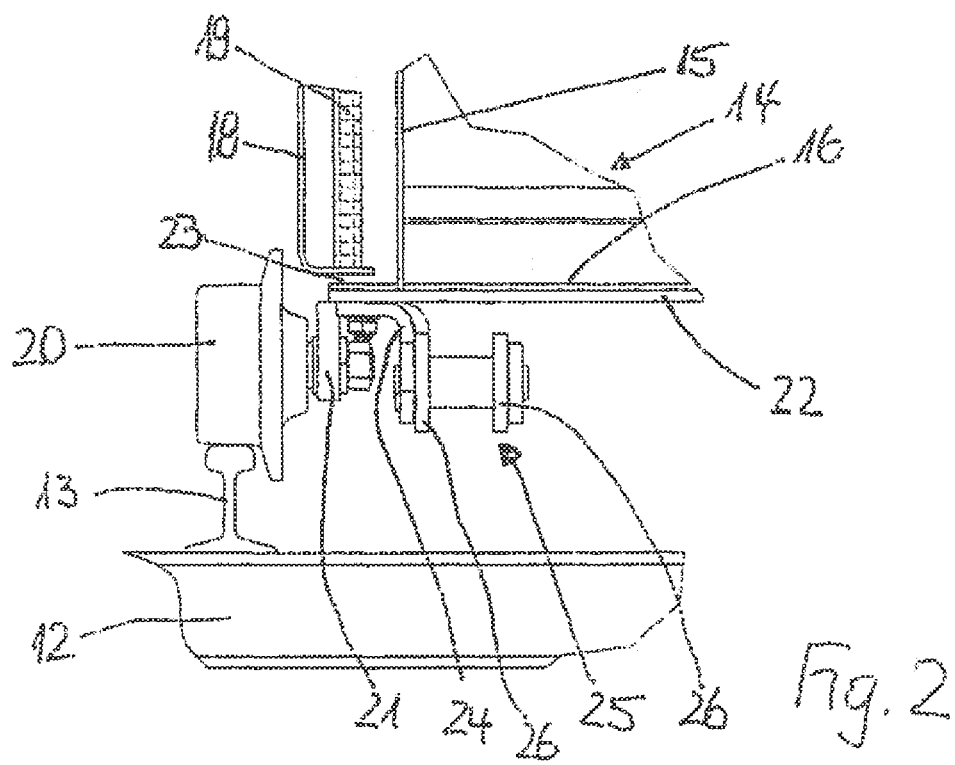
FIG. 2 shows, in a magnified representation corresponding to FIG. 1, the assignment of a side cover, a roller and a detail of a conveying cell showing a sealing plate as a sealing element.

As can be seen more clearly in detail from FIG. 2, lateral rollers 20 each running on rails 13 are disposed either on each conveying cell or on each xth conveying cell in order to support conveying cells 14, to which rollers vertical supports plates 21 are affixed, on which bottom 16 of conveying elements 14 rests. A sealing plate 22 lying opposite top cover 17 is disposed between support plates 21 and bottom 16 of a conveying cell 14, said sealing plate forming a sealing gap 23 with the lower end of stationary side cover 18 hanging down in each case from top cover 17. It can be seen here that side covers 18 are disposed inside the distance between mutually opposite rollers 20, so that sealing gap 23 arises in each case between sealing plate 22 moving along with assigned conveying cell 14 and the lower end of stationary side covers 18.

For the movement of conveying cells 14 along frame 10 or rails 13, traction means 25 in the form of a chain are provided on both sides of conveying cells 14, outer chain link plates 26 whereof are connected, in each case by means of an angle bracket 24 carried by said chain link plates, to sealing plate 22 and thus also to bottom region 16 of conveying cells 14. It can be seen that angle bracket 24, for supporting chain link plates 26, is shifted so far outwards in the direction of roller 20 that the seating of angle bracket 24 is shifted outside the region lying at actual bottom 16 of conveying cell 14, so that the thermal load on angle bracket 24 due to the hot material lying on bottom 16 is reduced.

Not represented further, a central chain or a chain with link plates angled off on both sides can also be used for the movement of conveying cells 14.

Not represented further in detail, sealing plates 22 fitted in each case to conveying cells 14 extend in the longitudinal direction of the conveying system also over the intermediate spaces that may exist between conveying cells 14, so that a kind of continuous belt mat laid beneath conveying cells 14 is formed, which ensures a complete cover of the underside of conveying cells 14 against the surrounding atmosphere.

Figure 3:
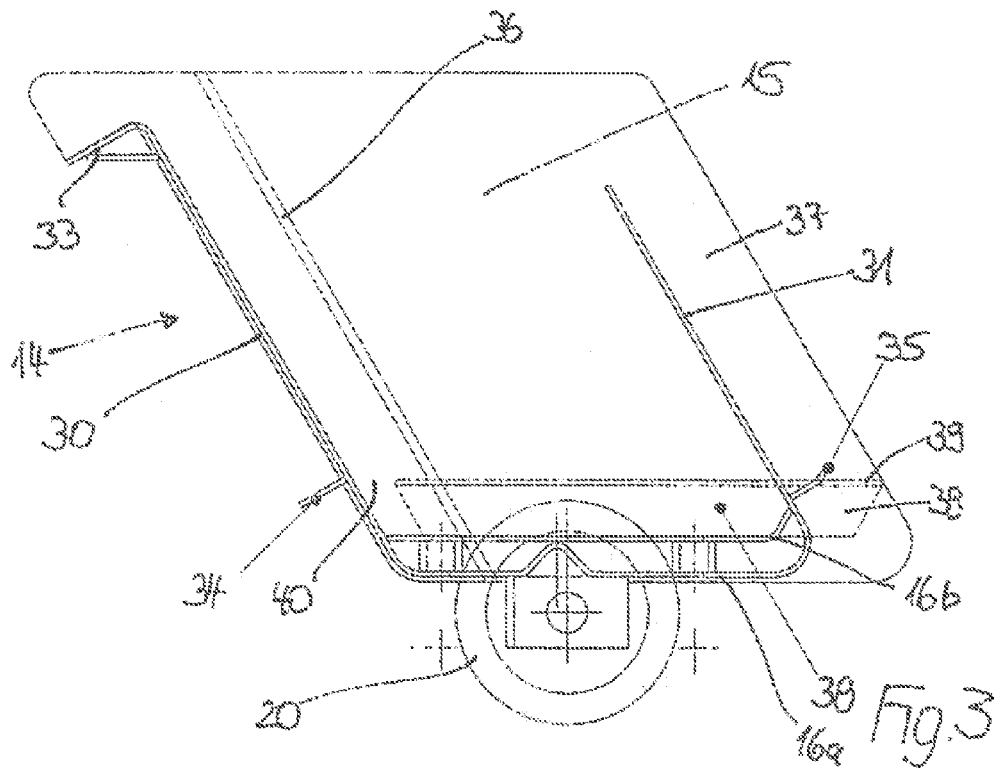
FIG. 3 shows, in a side view, another embodiment of an individual conveying cell with sealing elements fitted thereto.
Figure 5:
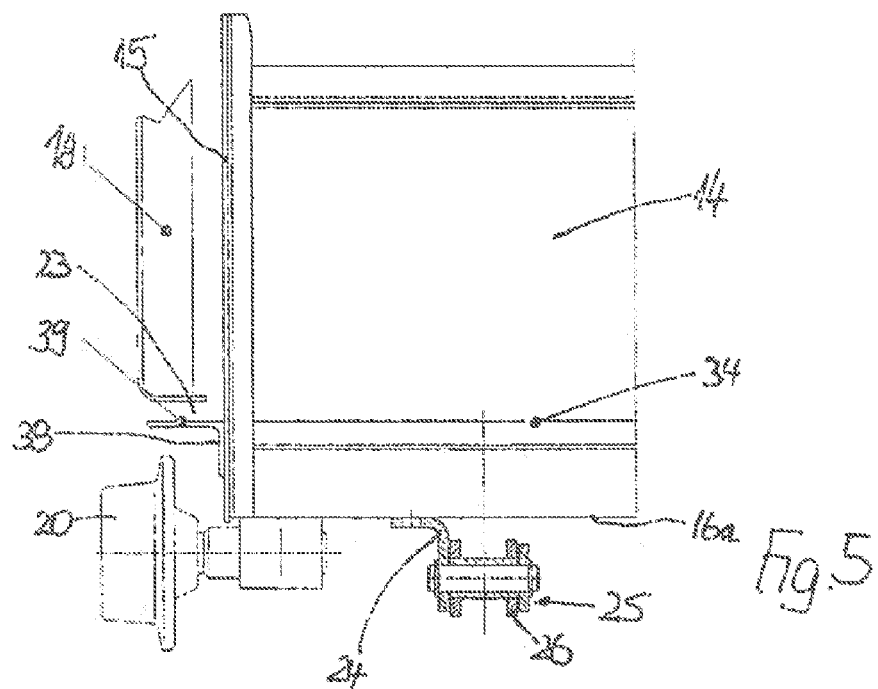
FIG. 5 shows, in a representation corresponding to FIG. 2, the assignment of the conveying cell represented in FIG. 3 and FIG. 4 to the side cover and roller.
Figure 4:
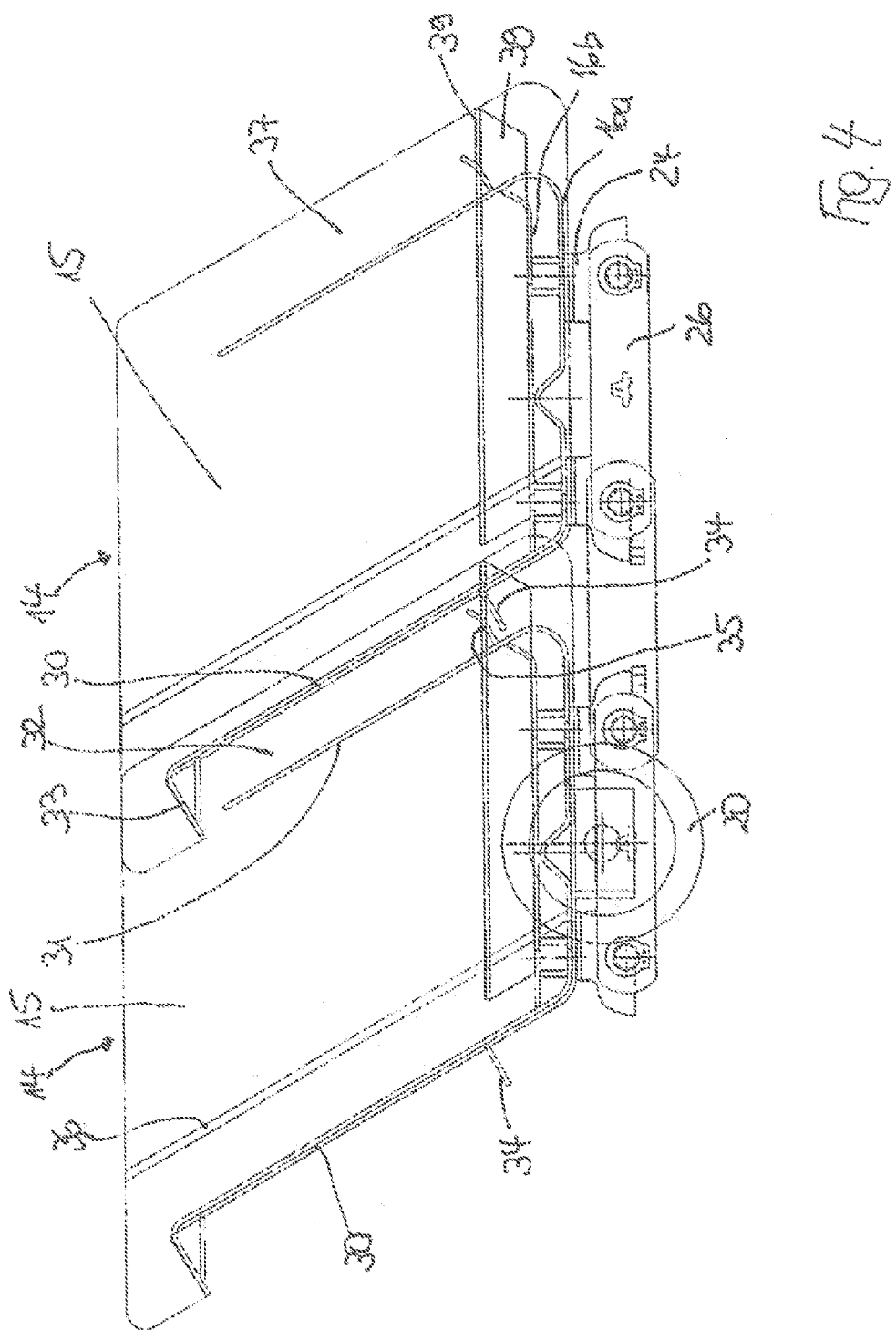
FIG. 4 shows, in a side view, a sequence of two conveying cells constituted according to the representation in FIG. 3.

Another example of embodiment of the invention is represented in FIGS. 3 to 5, wherein individual conveying cells 14 are provided, which are sealed off against one another in each case by means of separate sealing elements.

As can also be seen in this regard, in particular from FIGS. 3 and 4, each conveying cell 14 comprises, in addition to its bottom 16 and side walls 15, a front wall 30 pointing in the conveying direction and an opposite-lying rear wall 31, wherein an intermediate space 32 arises between individual conveying cells 14.

On each conveying cell 14, there is disposed at its front wall 30 a sealing plate 34 projecting therefrom and at its rear wall 31 a sealing plate 35 projecting therefrom, the arrangement of said sealing plates being made in such a way that front sealing plate 34 fixed to front wall 30 of the one conveying cell 14 overlaps with rear sealing plate 35 fixed to rear wall 31 of conveying cell 14 in front, as can be seen from FIG. 3. In order to improve the sealing, provision is also made such that front wall 30 of each conveying cell 14 comprises at its upper edge a bent-off portion 33 projecting from front wall 30 in the direction of conveying cell 14 in front and engaging over intermediate space 32 to conveying cell 14 in front, said bent-off portion extending over the upper edge of rear wall 31 of conveying cell 14 in front. In addition, rear wall 31 of each conveying cell 14 is disposed displaced forwards in the conveying direction by a region 37 with respect to the—in the conveying direction—rear end of respective side walls 15, wherein front wall 30 of a following conveying cell 14 engages in each case between side walls 15 of conveying cell 14 in front and side walls 15 of successive conveying cells 14 overlap by a partial region. Intermediate space 32 in each case between two conveying cells 14 is thus completely sealed off.

With regard to lateral sealing of conveying cells 14 to stationary side covers 18, an angled sealing plate 38 is fitted to the outer side of each side wall 15, outwardly projecting leg 39 of said sealing plate forming sealing gap 23 with the lower edge of stationary side covers 18 in the same way as described in respect of the example of embodiment represented in FIGS. 1 and 2 in respect of sealing plate 22. With regard to the described overlapping of the two side walls 15 of successive conveying cells 14, it must be ensured that each angled sealing plate 38 is disposed at a distance 40 from the front edge of each side wall 15, so that, when conveying cells 14 are pushed into one another, projecting legs 39 of angled sealing plates 38 fitted to individual conveying cells 14 form a continuous run, which ensures a correspondingly continuous seal with respect to the lower edge of stationary side covers 18.

In the case of the example of embodiment represented in FIG. 3, rollers 20 are likewise provided for the guidance of individual conveying cells 14. Angle brackets 24 for supporting chain link plates 26 are also fitted to bottom 16 of each conveying cell 14, said angle brackets however being disposed beneath the interior of conveying cell 14 in the example of embodiment represented. In order to reduce a corresponding thermal load here on angle brackets 24 due to hot material lying in the interior of conveying cells 14, bottom 16 of each conveying cell 14 is constituted false-bottomed with two bottom plates 16a and 16b.

The features of the subject-matter of these documents disclosed in the above description, the claims, the abstract and the drawing may be essential individually and also in any combinations with one another for the implementation of the invention in its various embodiments.

The specification incorporates by reference the disclosure of German patent application DE 20201105147.6, filed Sep. 28, 2011, as well as PCT/EP2012/069039, filed Sep. 27, 2012.

The present invention is, of course, in no way restricted to the specific disclosure of the specification and drawings, but also encompasses any modifications within the scope of the appended claims.

The invention claimed is:

1. A conveying system comprising:
a plurality of conveying cells (14) for accommodating bulk or loose material, wherein each of said conveying cells (14) includes a bottom (16), a front wall (30) and a rear wall (31) as viewed in a conveying direction of said conveying system, and side walls (15) that connect said front and rear walls (30, 31), and wherein said conveying cell (14) is open in an upward direction;
for protecting each of said upwardly open conveying cells (14) from the surrounding atmosphere: a stationary and gas-tight top cover (17) that spans the open space of said upwardly open conveying cell (14), and stationary and gas-tight side covers (18) disposed on opposite sides of said conveying cell (14), wherein an interior space is formed in said conveying cell (14) by said top cover (17) and said side covers (18) for receiving a protective gas; and
disposed in a bottom region of each of said conveying cells (14) that is located opposite said top cover (17): sealing elements (22, 34, 35) that protect intermediate spaces (32) existing between successive ones of said conveying cells (14) as viewed in the conveying direction from the surrounding atmosphere, as well as further sealing elements (22, 38) that on opposite sides extend laterally beyond said side walls (15) of said conveying cell (14), wherein said further sealing elements (22, 38) form respective sealing gaps (23) with a lower edge of said side covers (18).

2. A conveying system according to claim 1, wherein said sealing elements (34, 35) that seal off said conveying cells (14) relative to one another in the conveying direction are respectively disposed at said front wall (30) and said rear wall (31) of each of said conveying cells (14) and are configured as sealing plates (34, 35) that project from said conveying cell (14) into said intermediate spaces (32) that exist between successive ones of said conveying cells (14), further wherein said sealing plate (35) that is disposed on said rear wall (31) of one of said conveying cells (14) overlaps with that sealing plate (34) that is disposed on said front wall (30) of the following conveying cell (14).

3. A conveying system according to claim 1, wherein said rear wall (31) of each of said conveying cells (14) is offset forwardly as viewed in the conveying direction relative to a rear end of said two side walls (15) as viewed in the conveying direction, further wherein said front wall (30) of a following one of said conveying cells (14) engages between said side walls (15) of the leading ones of said conveying cells (14), and wherein said side walls (15) of said successive conveying cells (14) partially overlap one another.

4. A conveying system according to claim 1, wherein an upper edge of said front wall (30) of each of said conveying cells (14) is provided with a bent-off portion (33) that projects from said front wall (30) in a direction toward a leading one of said conveying cells (14), further wherein said bent-off portion (33) extends over said intermediate space (32) between said conveying cell (14) and the leading conveying cell, and wherein said bent-off portion (33) extends over an upper edge of said rear wall (31) of said leading conveying cell (14).

5. A conveying system according to claim 1, wherein said further sealing elements (38) are respectively configured as angled sealing plates (38) disposed on said two side walls (15) of each of said conveying cells (14), wherein a leg (39) of said sealing plate (38) that projects from said side wall (15) forms said sealing gap (23) with said lower edge of said side cover (18).

6. A conveying system according to claim 5, wherein each of said angled sealing plates (38) that is mounted on one of said side walls (15) is disposed at a distance (40) from a front edge of said side wall (15) as viewed in the conveying direction, further wherein said distance (40) corresponds to the overlapping of said side walls (15) of adjacent ones of said conveying cells (15) such that said projecting legs (39) of said sealing plates (38) on said side walls (15) of successive ones of said conveying cells (14) form a continuous run.

7. A conveying system according to claim 1, wherein said sealing elements (22) include sealing plates (22) that are disposed on an underside of said conveying cells (14) opposite said top cover (17), further wherein said sealing plates (22) move with said conveying cells (14), further wherein said sealing plates (22), in the form of a continuous belt mat, protect said conveying cells (14), and said intermediate spaces (32) existing between successive conveying cells (14), from the surrounding atmosphere, and wherein said sealing plates (32) project on both sides beyond said side walls (15) to thereby form said sealing gaps (23) with said lower edge of said side covers (18).

8. A conveying system according to claim 1, which further includes rollers (30) that are disposed on opposite sides for guiding said conveying cells (14), wherein said rollers (20) run on rails (13) disposed outwardly of said conveying cells (14), and wherein said side covers (18) are disposed within the space that exists between oppositely disposed ones of said rollers (20) to at that location form said sealing gaps (23) with said further sealing elements (22, 38).

9. A conveying system according to claim 1, wherein said bottom (16) of said conveying cell (14) is coupled with at least one traction member (25).

10. A conveying system according to claim 9, wherein said at least one traction member (25) is embodied as a chain having chain link plates (26) that are respectively fastened to said conveying cell (14) by means of angle brackets (24) that are secured to said bottom (16) of said conveying cell (14).

11. A conveying system according to claim 9, wherein sealing elements (22) in the form of sealing plates are disposed between said bottom (16) of said conveying cell (14) and said at least one traction member (25).

12. A conveying system according to claim 1, wherein an inside of said side covers (18) that face said conveying cells (14) are lined with an insulating layer (19).

* * * * *